US012323054B2

(12) United States Patent
Inoue et al.

(10) Patent No.: US 12,323,054 B2
(45) Date of Patent: Jun. 3, 2025

(54) POWER CONVERTER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Takeshi Inoue, Nisshin (JP); Akimasa Niwa, Nisshin (JP); Junichi Hasegawa, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 195 days.

(21) Appl. No.: 18/192,892

(22) Filed: Mar. 30, 2023

(65) Prior Publication Data

US 2023/0327541 A1 Oct. 12, 2023

(30) Foreign Application Priority Data

Apr. 11, 2022 (JP) ................................ 2022-065129

(51) Int. Cl.
*H02M 1/08* (2006.01)
*H02M 1/00* (2006.01)
(Continued)

(52) U.S. Cl.
CPC ......... *H02M 1/327* (2021.05); *H02M 1/0009* (2021.05); *H02M 1/08* (2013.01); *H02M 7/53871* (2013.01)

(58) Field of Classification Search
CPC ...... H02M 1/327; H02M 1/0009; H02M 1/08; H02M 7/53871
See application file for complete search history.

(56) References Cited

U.S. PATENT DOCUMENTS

2008/0308788 A1 12/2008 Ebe et al.
2023/0308031 A1* 9/2023 Mano .................. H02M 7/4815
2024/0291402 A1* 8/2024 Kawahara ........... H02M 1/0009

FOREIGN PATENT DOCUMENTS

JP H11-299218 A 10/1999
JP 2002-119043 A 4/2002
(Continued)

*Primary Examiner* — Adolf D Berhane
(74) *Attorney, Agent, or Firm* — Posz Law Group, PLC

(57) ABSTRACT

A power converter includes multiple arms, a temperature detector, a voltage detector, a current detector, a heat generation controller, and a heat resistance estimator. Each of the multiple arms includes a target element being a semiconductor element. The heat resistance estimator determines a heat resistance of the target element based on a temperature difference between a first temperature of the target element and a second temperature of the target element, a current through the target element detected by the current detector, and a voltage across conduction terminals of the target element detected by the voltage detector. The first temperature is a temperature detected by the temperature detector in a state where the heat generation controller has not caused the target element to generate heat. The second temperature is a temperature detected by the temperature detector in a state where the heat generation controller has caused the target element to generate heat.

9 Claims, 8 Drawing Sheets

1
5
13
10
TEMPERATURE DETECTOR
6
VOLTAGE DETECTOR
7
ON-VOLTAGE AND HEAT RESISTANCE ESTIMATOR
9
11
4
DRIVER
3
CURRENT DETECTOR
12
8
WATER TEMPERATURE SENSOR
14

(51) Int. Cl.
*H02M 1/32* (2007.01)
*H02M 7/5387* (2007.01)

(56) References Cited

FOREIGN PATENT DOCUMENTS

| | | | |
|---|---|---|---|
| JP | 2006-060035 | A | 3/2006 |
| JP | 2009-019953 | A | 1/2009 |
| JP | 2017-195714 | A | 10/2017 |
| JP | 2020-191707 | A | 11/2020 |

* cited by examiner

| ΔT | LIFESPAN cyc | INFLUENCE ON HEAT RESISTANCE ESTIMATION |
|---|---|---|
| 120 | 200,000 | 2.74% |
| 80 | 675,000 | 0.812% |
| 60 | 1,600,000 | 0.342% |
| 40 | 5,400,000 | 0.101% |

POWER CONVERTER

CROSS REFERENCE TO RELATED APPLICATION

This application is based on Japanese Patent Application No. 2022-065129 filed on Apr. 11, 2022, the disclosure of which is incorporated herein by reference.

TECHNICAL FIELD

The present disclosure relates to a power converter.

BACKGROUND

A semiconductor element such as a power metal-oxide-semiconductor field-effect-transistor (MOSFET) adopted in a power converter such as an inverter may have a thermal breakdown caused by a fatigue due to thermal stress and an overheating state due to the deformation of the semiconductor element caused by heat cycles.

SUMMARY

The present disclosure describes that a power converter includes multiple arms, and further describes that each of the multiple arms has two semiconductor elements connected in series.

DETAILED DESCRIPTION

Figure 1:
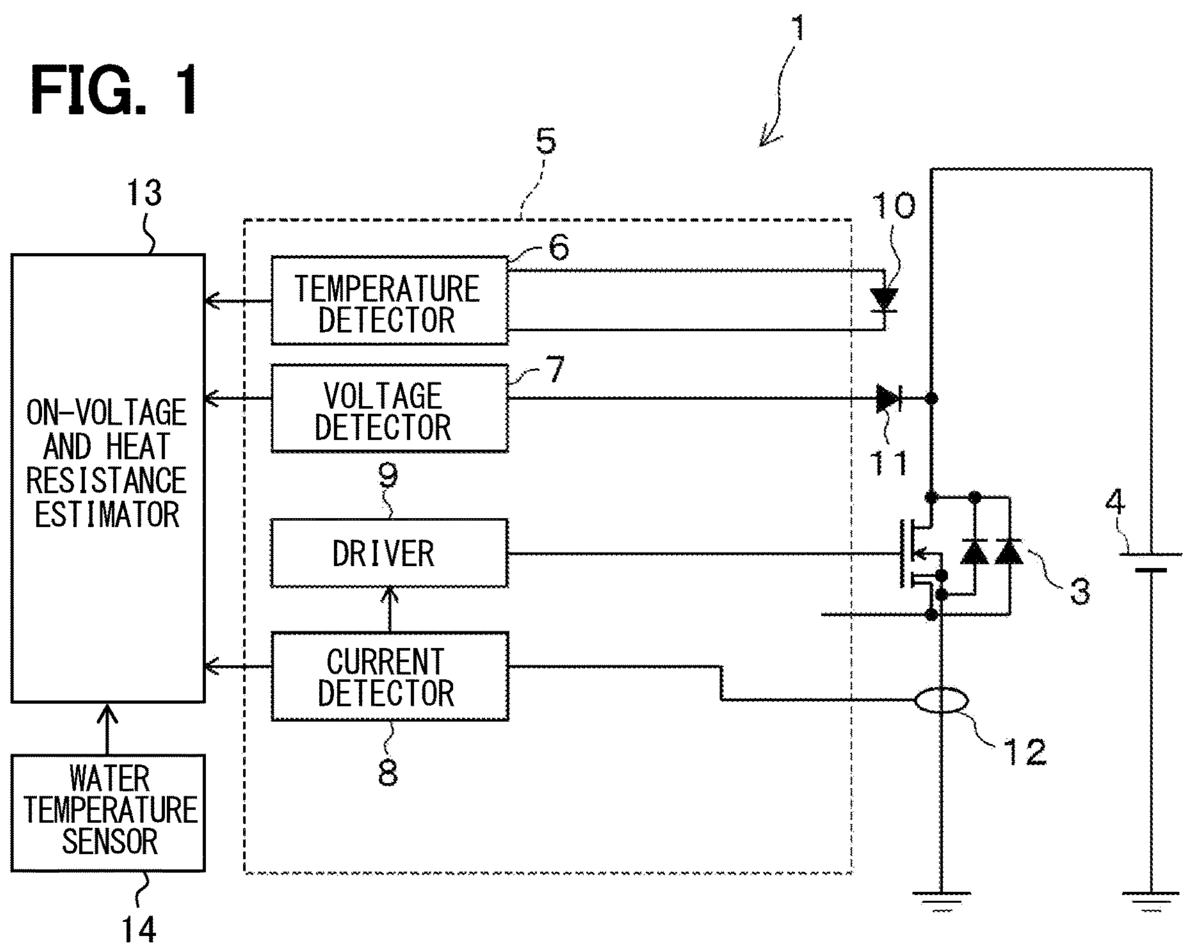
FIG. 1 is a functional block that illustrates a structure of a circuit for driving a semiconductor element included in a power converter in a first embodiment.

As a countermeasure for overheating a semiconductor element such as a MOSFET adopted in a power converter such as an inverter, a reliability test for the semiconductor element may be performed to ensure design assurance to secure reliability margin, and the degree of breakdown of a heat dissipation path may be evaluated by measuring a heat resistance of the heat dissipation path of the semiconductor element to avoid the breakdown of the semiconductor element.

For measuring the heat resistance of the heat dissipation path, the heat resistance may be estimated from a thermal response in a cooling process after preheating the semiconductor element. In a comparative example, a separate power supply may be used for heating and a drive power supply may be adopted. However, a countermeasure for avoiding the breakdown due to heat generation may not be implemented in the comparative example. Since transient heat measurement is performed in the comparative example, it may be required to perform complicated derivation, and a high-response voltage measurement system in the order of nanoseconds (ns) to microseconds (μs) may be required.

According to an aspect of the present disclosure, a power converter includes multiple arms, a temperature detector, a voltage detector, a current detector, a heat generation controller, and a heat resistance estimator. Each of the multiple arms has two semiconductor elements being a first semiconductor element and a second semiconductor element connected in series. Each of the two semiconductor elements is driven by a voltage. The temperature detector detects a temperature of each of the two semiconductor elements. The voltage detector detects a voltage across conduction terminals of each of the two semiconductor elements. The current detector detects a current flowing through each of the two semiconductor elements. The first semiconductor element is a target element whose heat resistance is estimated by the heat resistance estimator. The heat generation controller applies a driving signal to a control terminal of the target element to control heat generation of the target element, based on a condition that amount of the heat generation of the target element is restricted at a certain level or lower; and the heat generation controller applies a driving signal to a control terminal of the second semiconductor element to fully turn on the second semiconductor element. The heat resistance estimator estimates the heat resistance of the target element based on (i) a temperature difference according to a first temperature of the target element and a second temperature of the target element, (ii) a voltage across the conduction terminals of the target element detected by the voltage detector, and (iii) a current through the target element detected by the current detector. The first temperature is a temperature detected by the temperature detector in a state where the heat generation controller has not caused the target element to generate heat. The second temperature is a temperature detected by the temperature detector in a state where the heat generation controller has caused the target element to generate heat.

According to the above structure, it is possible to estimate the heat resistance without adopting a power supply for heating. Even when the target element is heated, since the target element is driven based on a condition that the amount of heat generation is restricted to a certain value or less, it is possible to estimate the heat resistance while the degradation level of the characteristics of the semiconductor element can be maintained to a negligible level.

The power converter described above may control a driving voltage of the target element to be larger than a threshold voltage or lower than a full-on voltage or may execute a pulse-width-modulation (PWM) control at a high frequency, to maintain the temperature in a state where the target element has generated heat at a constant level. Therefore, the amount of heat generation of the target element can be restricted to a certain value or less.

In the power converter described above, the current detector may virtually ground detection terminals of a sense resistor through a virtual ground device, when a voltage across the detection terminals of the sense resistor through the virtual ground. According to such a structure, the thermal voltage of the sense resistor is cancelled by the virtual ground. Thus, it is possible to avoid narrowing the range of the driving voltage of the semiconductor element and enhance the control precision.

First Embodiment

Figure 3:
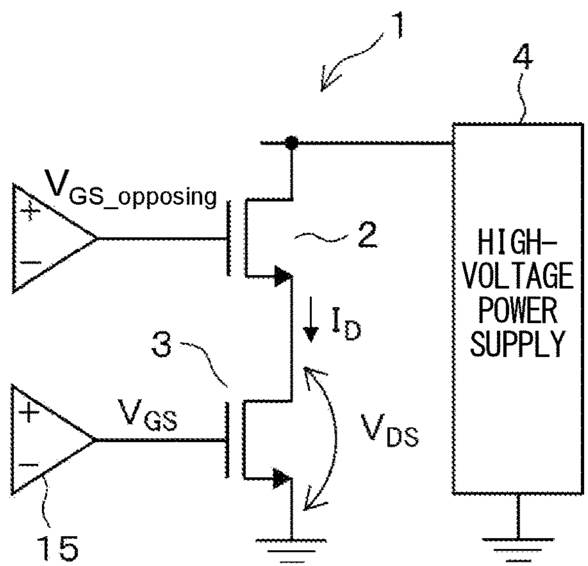
FIG. 3 illustrates a voltage applied to respective elements in upper and lower arm portions built for a single phase and a current flowing through the respective elements in the upper and lower arm portions.

As illustrated in FIG. 3, a power converter 1 according to the present embodiment has a series circuit of voltage-driven semiconductor elements, for example, N-channel MOSFETs 2 and 3. In the following, the MOSFET may be simply referred to as a FET. The series circuit is connected between a high-voltage power supply 4 and a ground. The voltage of the high-voltage power supply 4 is, for example, approximately 200 volts to 650 volts. The power converter 1 is a three-phase inverter. The above-mentioned series circuit is one of multiple series circuits that are connected in parallel and built for three phases.

As illustrated in FIG. 1, a drive circuit 5 for driving the FET 3 is constructed as, for example, an integrated circuit (IC). The drive circuit 5 includes, for example, a temperature detector 6, a voltage detector 7, a current detector 8 and a driver 9. FIG. 1 omits the illustration of the FET 2 for simplicity. In the present embodiment, the FET 3 is configured as a target element whose heat resistance is to be estimated. The heat resistance may also be referred to as thermal resistance.

A temperature sensor 10 is, for example, a diode to be disposed for detecting the temperature of the FET 3. The temperature detector 6 detects a voltage across the terminals of the diode. $T_j$ denotes the temperature detected by the temperature sensor 10. An input terminal of the voltage detector 7 is connected to a drain of the FET 3 through a diode as a voltage sensor 11. The voltage detector 7 detects a voltage between the drain and source of the FET 3. The voltage between the drain and source of the FET 3 is a voltage between conduction terminals of the FET 3. In the following, the voltage between the drain and the source is simply referred to as a drain voltage.

A current sensor 12 detects a current flowing through the source of the FET 3. A sensor signal of the current sensor 12 is sent to the current detector 8. Respective output signals of the temperature detector 6, the voltage detector 7 and the current detector 8 are sent to an on-voltage and heat resistance estimator 13. The on-voltage and heat resistance estimator 13 may also be referred to as a heat resistance estimator. The on-voltage and heat resistance estimator 13 also receives a sensor signal of a water temperature sensor 14. The water temperature sensor 14 detects the temperature of cooling water circulating in a heat pipe to cool down the FETs 2 and 3. $T_w$ denotes the temperature detected by the water temperature sensor 14. The on-voltage and heat resistance estimator 13 described in the present disclosure may be composed of a general-purpose CPU (Central Processing Unit), a volatile memory such as RAM, a non-volatile memory such as ROM, flash memory, or hard disk, various interfaces, and an internal bus connecting them. Then, by executing software on these hardware, the on-voltage and heat resistance estimator 13 can be configured to execute the functions described in the present disclosure.

Figure 2:
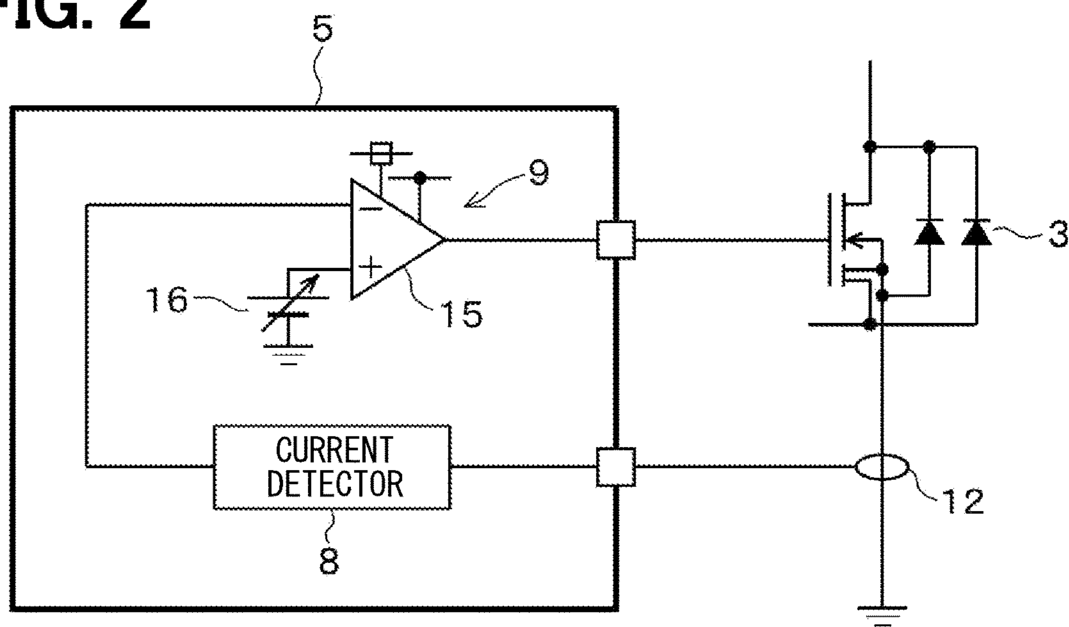
FIG. 2 illustrates a circuitry structure of a driver.

The output signal of the current detector 8 is also sent to the driver 9. As illustrated in FIG. 2, the driver 9 corresponding to a heat generation controller includes, for example, an operational amplifier 15. A non-inverting input terminal of the operational amplifier 15 receives a reference voltage from a reference voltage source 16 whose voltage is variable, and an inverting input terminal of the operational amplifier 15 is connected to the output of the current detector 8. An output terminal of the operational amplifier 15 is connected to a gate of the FET 3. The operational amplifier 15 executes feedback control of the gate voltage of the FET 3 so that the current flowing through the FET 3 is constant.

Figure 4:
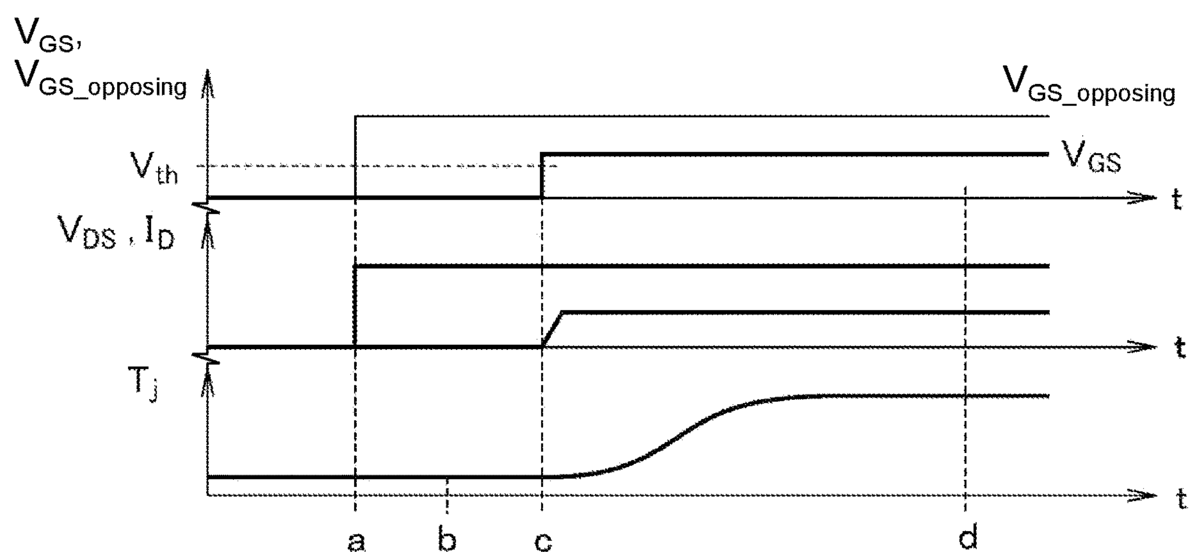
FIG. 4 is a timing chart that illustrates a change in each of a voltage, a current, and a temperature according to an operation for estimating a heat resistance.

The following describes an operation in the present embodiment. As illustrated in FIGS. 3 and 4, $V_{GS}$ denotes the gate voltage of the FET 3, and $V_{GS\_opposing}$ denotes the gate voltage of the FET 2. At a time point "a" in FIG. 4, when only the gate voltage $V_{GS\_opposing}$ is applied at a level that greatly exceeds a threshold voltage $V_{th}$, for example, a normal driving voltage that causes the FET 3 to be fully turned on during a normal operation, a voltage $V_{DS}$ corresponding to the voltage of the high-voltage power supply 4 is applied between the drain and source of the FET 3. The on-voltage and heat resistance estimator 13 acquires the temperature $T_w$ detected by the water temperature sensor 14 at the subsequent time point "b" in FIG. 4. In a case where the water temperature sensor 14 is not adopted, the on-voltage and heat resistance estimator 13 acquires the temperature $T_j$ detected by the temperature sensor 10 at the time point "b" as an initial temperature $T_{jint}$.

At a time point "c" in FIG. 4, when the gate voltage $V_{GS}$ is applied at a level exceeding the threshold voltage $V_{th}$ and below the normal driving voltage, the drain current $I_D$ begins to flow in the FET 3. Therefore, the FET 3 is heated. The on-voltage and heat resistance estimator 13 acquires the temperature $T_j$, the voltage $V_{DS}$ and the current $I_D$ at a time point where it is estimated that the temperature rise of the FET 3 has reached saturation as the time point "d".

The on-voltage and heat resistance estimator 13 estimates a heat resistance $R_{th}$ of the FET 3 according to the following mathematical relation (1).

$$R_{th}=(T_j-T_w)/(V_{DS}\times I_D) \quad (1)$$

When the initial temperature $T_{jint}$ is adopted instead of the temperature $T_w$, the following mathematical relation (2) is obtained.

$$R_{th}=(T_j-T_{jint})/(V_{DS}\times I_D) \quad (2)$$

At the time point "d" in FIG. 4, the temperature $T_j$ at which the temperature rise of the FET 3 is saturated, in other words, the acceptable amount of the heat generation of the FET 3 differs according to the frequency of estimating the heat resistance and the design parameters such as the product lifespan of the power converter 1. For example, in a case where the estimation frequency of the heat resistance is once per day and the lifespan of the product is 15 years, the estimation of heat resistance can be executed 5479 times until the end of the lifespan of the product.

Temperature acceleration models used for estimating the lifespan of a semiconductor include, for example, the Arrhenius model and the Eyring model. In the Eyring model, the life L is expressed in the following mathematical relation (3) where L denotes the life, A denotes the constant, ΔT denotes the temperature difference, and n denotes the temperature acceleration coefficient.

$$L=A(\Delta T)^{-n} \quad (3)$$

The following relation (4) is obtained by adopting the mathematical relation (3). In the relation (4), L1 denotes the number of life cycles at the derating temperature difference ΔT1, L2 denotes the number of executing cycles at the reliability test temperature difference ΔT2, and the αΔT denotes the temperature difference acceleration coefficient.

$$\alpha\Delta T=L1/L2=(\Delta T2/\Delta T1)^{n} \quad (4)$$

The following mathematical relation (5) is derived from the relation (4).

$$L2=L1(\Delta T2/\Delta T1)^{-n} \quad (5)$$

Figures 5, 6:
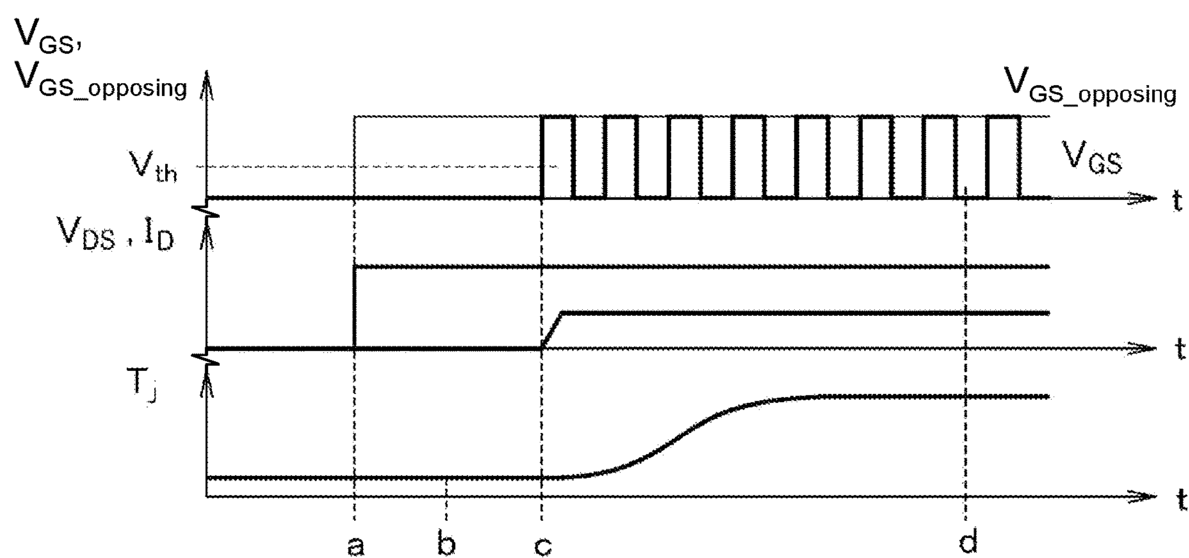
FIG. 5 illustrates, derived from the Eyring model, a relationship between a rising width of the temperature and number of heat cycles corresponding to a lifespan of a component.
FIG. 6 illustrates a second embodiment and corresponds to FIG. 4.

In the relations (4) and (5), n denotes the temperature acceleration coefficient and differs according to the material of a module including the semiconductor element. Based on a condition that, for example, n is equal to 3 and the number of life cycles L1 is 1.2 million at the temperature different ΔT=120 degrees Celsius, the influence percentage of the life cycles and the estimation of heat resistance on the life is illustrated in FIG. 5 as an example. Although it depends on how much margin is set, it is estimated that setting ΔT around 60 degrees Celsius may be desirable based on the above condition.

According to the present embodiment described above, the power converter 1 includes multiple arms. In each of the arms, the N-channel MOSFETs 2 and 3 are connected in series. The on-voltage and heat resistance estimator 13 detects the temperature prior to the heat generation of the FET 3, the drain voltage and the electrical current through the temperature detector 6, the driver 9 applies a driving signal to the gate of the FET 3 with a level equal to or larger than the threshold voltage based on the condition that the amount of heat generation is restricted to a certain level or below. Subsequently, the temperature after causing heat generation, the drain voltage and the electrical current are detected, and the heat resistance is determined based on the temperature before or after heat generation, the drain voltage and the current. In particular, the heat resistance is estimated based on the relation (1) or (2).

According to the above structure, it is possible to estimate the heat resistance without using a power supply for heating. Even when the FET 3 is heated, since the FET 3 is driven based on a condition that the amount of heat generation is restricted to a certain value or less, it is possible to estimate the heat resistance while the degradation level of the characteristics of the FET 3 can be maintained to a negligible level. Then, the driver 9 controls the driving voltage of the FET 3 to be equal to or larger than the threshold voltage and to be at a level less than a full-on voltage that causes the FET 3 to be fully turned on, so that the current value of the FET 3 is kept constant. Therefore, it is possible to restrict the amount of heat generation of the FET 3 to be at a certain level or lower. By adopting the relation (1) or (2), it is possible to easily estimate the stationary heat resistance, and it is also possible to estimate the heat resistance even if the voltage measurement system has a lower response in the order of milliseconds or more.

Second Embodiment

Figure 7:
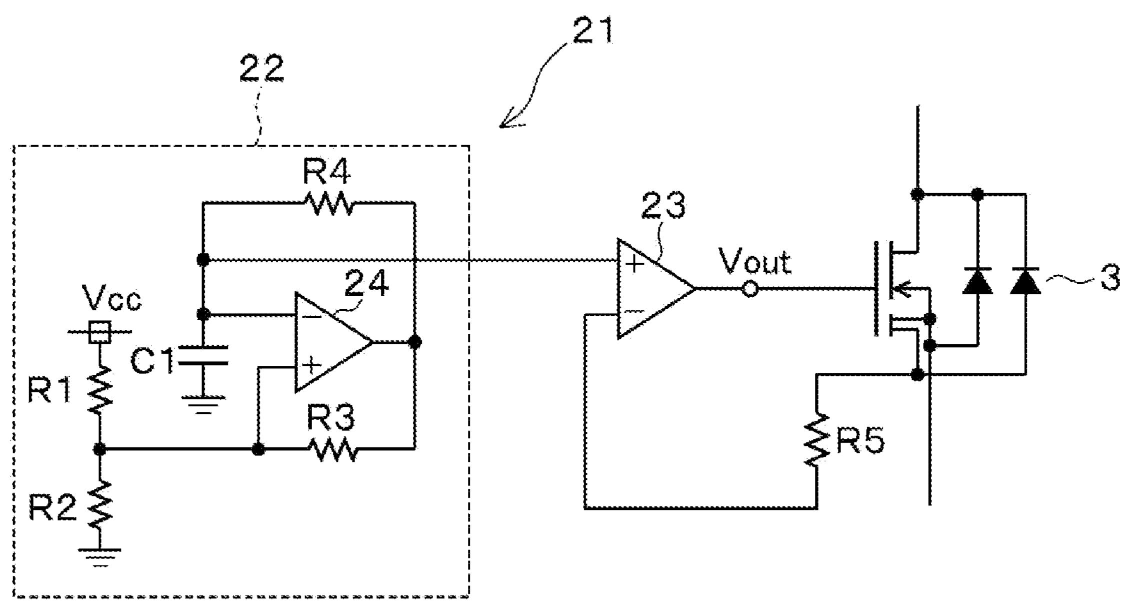
FIG. 7 illustrates a circuitry structure of a driver.

Hereinafter, the same components as those of the first embodiment are denoted by the same reference numerals, and descriptions of the same components will be omitted, and different portions will be described. As illustrated in FIG. 6, in the second embodiment, the gate voltage $V_{GS}$ is output as a pulse-width-modulation (PWM) signal having an adjusted on-period and an adjusted off-period, in order to have the amount of heat generation identical to the first embodiment. In the on-period, the PWM signal is at a high level. In the off-period, the PWM signal is at a low level. In other words, the duty ratio of the PWM signal is adjusted to have the amount of heat generation identical to the first embodiment. If the frequency of the PWM signal adopts a carrier to be adopted for the PWM control to control the switching of the FETs 2 and 3 during the normal operation of the power converter 1, the frequency of the PWM signal can be realized without modulating the frequency. However, if the ripple of temperature change is large due to the heat radiation characteristics of the module, it may be difficult to estimate the heat resistance as the ripple of the temperature change becomes larger. Thus, it may be required to perform switching at the frequency equal to or higher than the carrier frequency. As illustrated in FIG. 7, the driver 9 is replaced by a driver 21. The driver 21 is constructed by the combination of a rectangular wave generation circuit 22 and a comparator 23.

The rectangular wave generation circuit 22 has an operational amplifier 24, a first series circuit and a second series circuit. The first series circuit has resistors R1 and R2 connected in series between the power supply $V_{cc}$ and the ground. The second series circuit includes resistors R3 and R4 and a capacitor C1 connected in series between the ground and the common connection node between the resistors R1 and R2. The common connection node between the resistors R1 and R2 is connected to a non-inverting input terminal of the operational amplifier 24. An inverting input terminal of the operational amplifier 24 is connected to the common connection node between the resistor R4 and the capacitor C1. The output terminal of the operational amplifier 24 is connected to the common connection node between the resistors R3 and R4.

A non-inverting input terminal of the comparator 23 is connected to the common connection node between the resistor R4 and the capacitor C1, and an inverting input terminal of the comparator 23 is connected to the drain of the FET 3 for sensing current through a resistor R5 corresponding to a sense resistor. According to the second embodiment configured as described above, the same effects as those of the first embodiment can be provided.

Third Embodiment

Figure 8A:
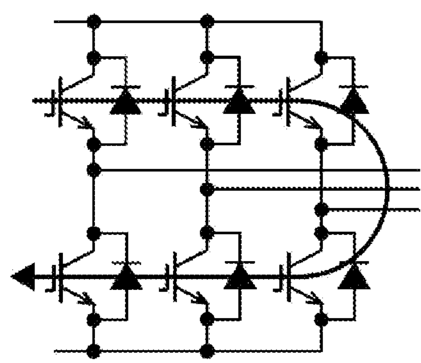
FIG. 8A illustrates a sequence for individually estimating six semiconductor elements in the upper and lower arm portions.
Figure 8B:
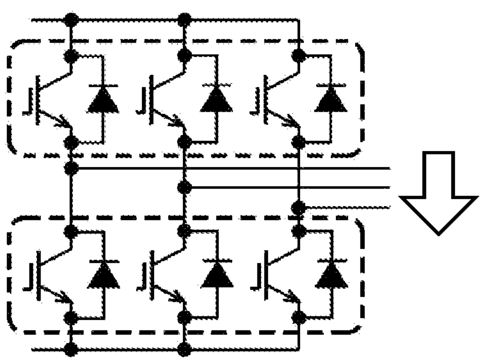
FIG. 8B illustrates a sequence for shortening the estimation of the heat resistance in each element of three upper and lower arm portions built for three phases in a third embodiment.

The following describes a third embodiment for shortening a total time required for estimating heat resistances of all of the semiconductor elements in the power converter. As illustrated in FIGS. 8A and 8B, six semiconductor elements are connected in a bridge form in a three-phase inverter. In FIGS. 8A and 8B, each of the semiconductor elements is illustrated by an IGBT symbol. As illustrated at FIG. 8A, in a case where the heat resistances of six semiconductor elements are individually estimated, the total time for estimating the respective heat resistances of six semiconductor elements is equal to six times of the time required for estimating the heat resistance of a single semiconductor element.

For example, the method for estimating the heat resistances described in the first embodiment can be executed concurrently for each phase. As illustrated at FIG. 8B, for example, the heat resistances of the semiconductor elements in the upper arm of each phase are estimated at a first occasion, and the heat resistances of the semiconductor elements in the lower arm portion of each phase are estimated at a second occasion.

Fourth Embodiment

Figure 9:
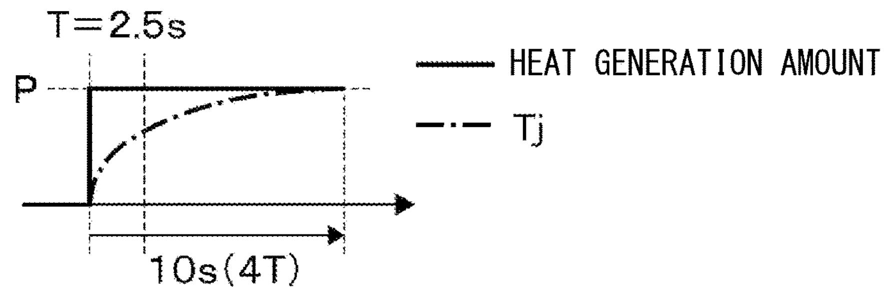
FIG. 9 illustrates a change in the amount of heat generation in the semiconductor element for shortening the time for estimating heat resistance in a fourth embodiment.

The following describes a fourth embodiment for shortening the time required for estimating the heat resistance. For example, as illustrated in FIG. 9, in the first embodiment, when a constant gate voltage $V_{GS}$ is applied to the FET 3 and the gate is charged with a substantially constant current, it will take 10 seconds being a reference time before the amount of heat generation of the semiconductor element reaches a saturation value P.

Figure 10:
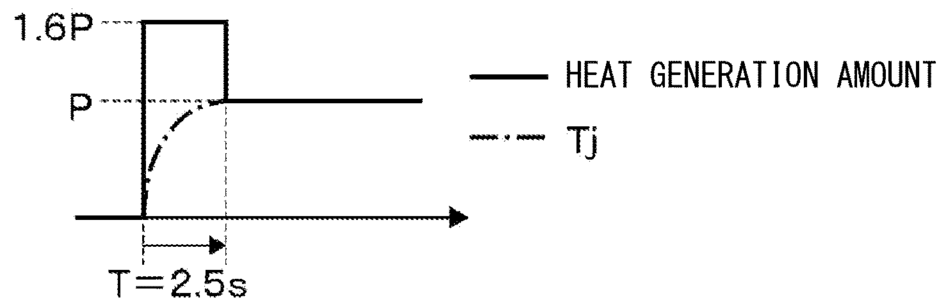
FIG. 10 illustrates a change in the amount of heat generation in the semiconductor element for shortening the time for estimating heat resistance.

In contrast, as illustrated in FIG. 10, the current for charging the gate is increased by enlarging the initial value of the gate voltage $V_{GS}$. By setting the amount of heat generation at that time to 1.6P, the temperature of heat generation of the FET 3 is rapidly increased. As a result, if it takes 2.5 seconds, which is shorter than the reference time described above, before the amount of heat generation reaches the saturation value P as illustrated in FIG. 10, the time required for estimating the heat resistance of a single semiconductor element is reduced to ¼ of the reference time described above.

Figure 11:
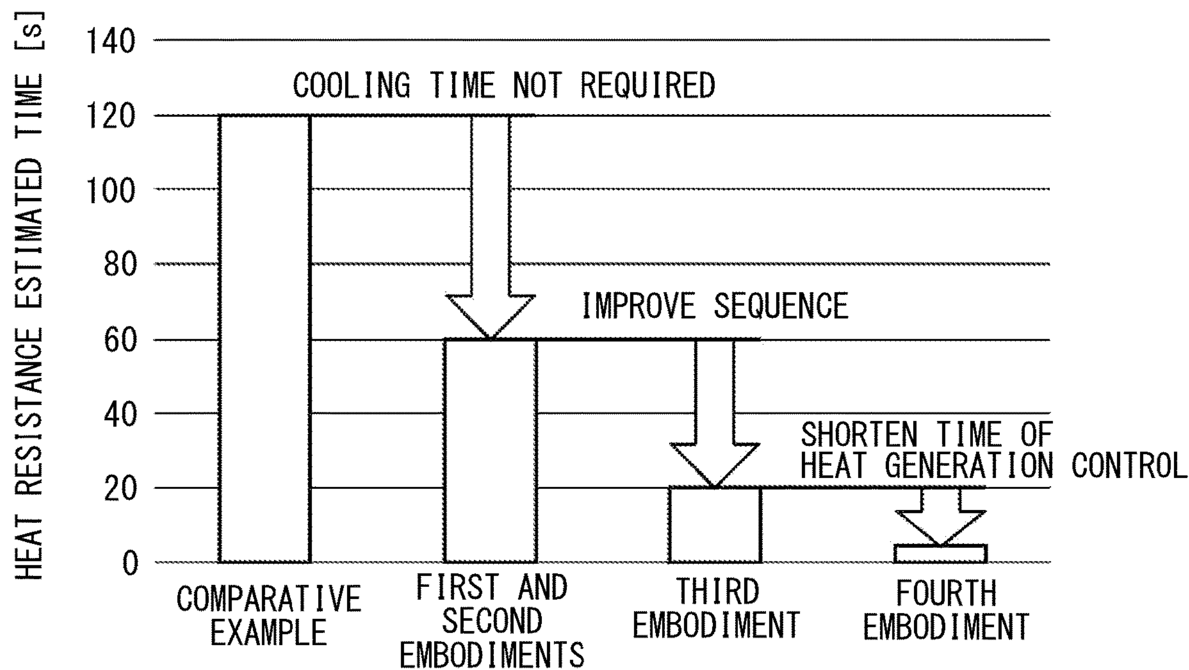
FIG. 11 illustrates a time required for estimating heat resistance in each of the first, second, third and fourth embodiments in comparison with a comparative example.

FIG. 11 illustrates that the time required for estimating the heat resistances of all six semiconductor elements in each of a comparative example, the first and second embodiments, the third embodiment and the fourth embodiment.

Fifth Embodiment

Figure 12:
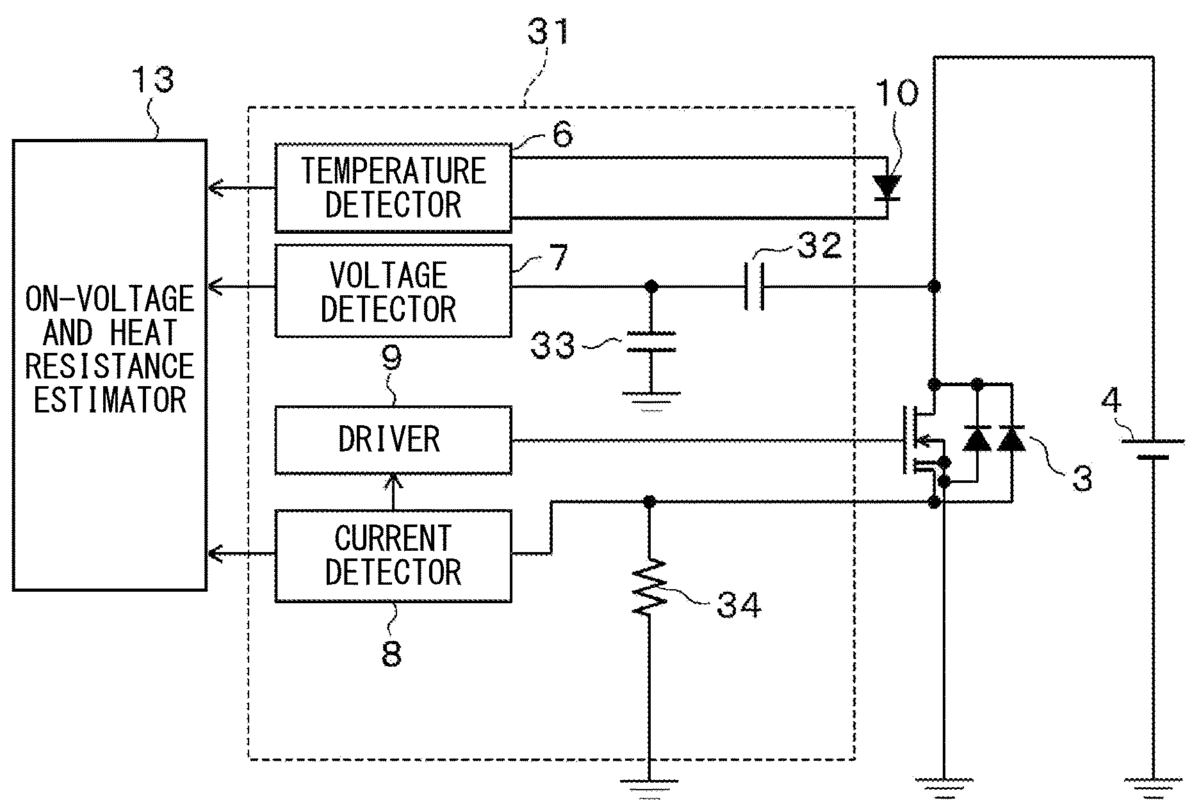
FIG. 12 is a functional block that illustrates a structure of a circuit for driving a semiconductor element included in a power converter in a fifth embodiment.

As illustrated in FIG. 12, in a drive circuit 31 according to a fifth embodiment, instead of the voltage sensor 11, a series circuit having capacitors 32 and 33 designed for high breakdown voltage connected in series is connected between the drain of the FET 3 and the ground. The input terminal of the voltage detector 7 is connected to the common connection node between the capacitors 32 and 33. Instead of the current sensor 12, a resistor 34 is connected between the drain of the FET for sensing the current in the FET 3 and the ground. The input terminal of the current detector 8 is connected to the drain.

The voltage detector 7 detects the drain voltage of the FET 3 acquired by a voltage division through the capacitors 32 and 33. The resistor 34 is a sense resistor adopted for, for example, overcurrent detection. If the sense resistor is adopted to detect the current $I_D$, it is not required to adopt the current sensor 12. Therefore, the entire system can be constructed in a smaller space with lower cost.

Sixth Embodiment

Figure 13:
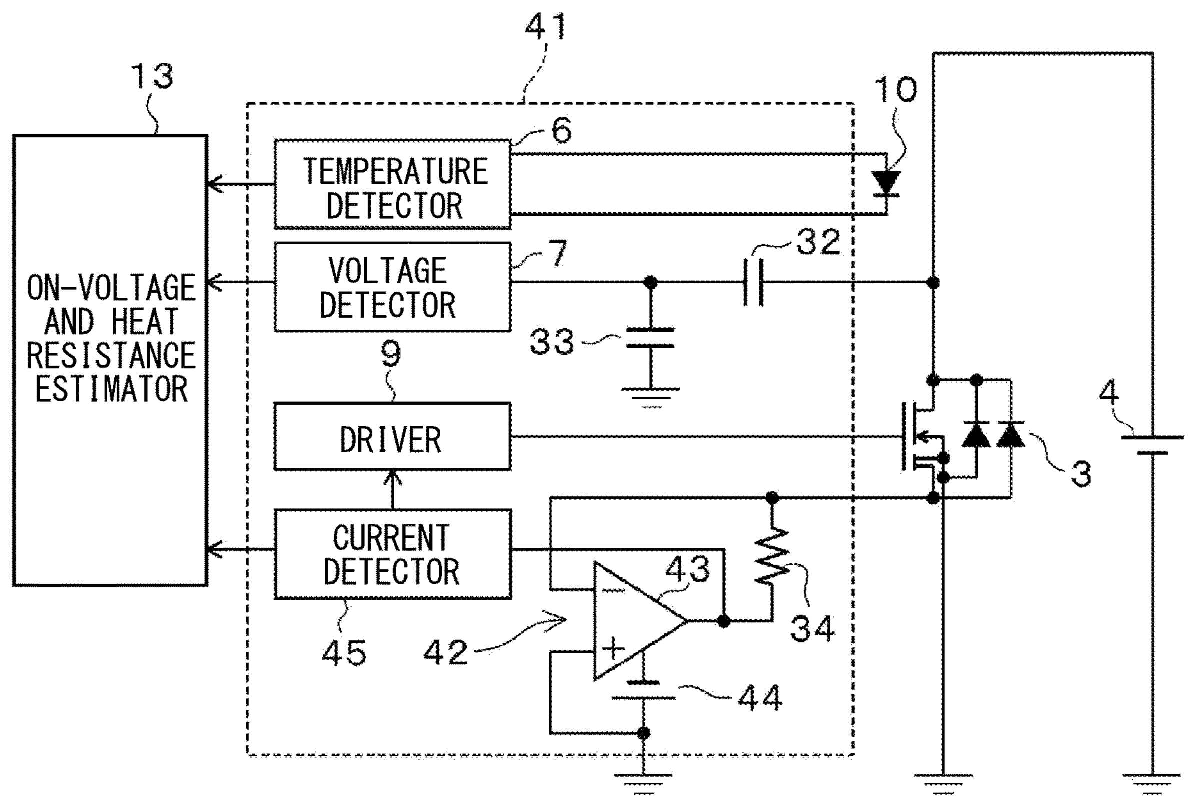
FIG. 13 is a functional block that illustrates a structure of a circuit for driving a semiconductor element included in a power converter in a sixth embodiment.

As illustrated in FIG. 13, a drive circuit 41 according to a sixth embodiment has a virtual ground device 42 added to the drive circuit 31 according to the fifth embodiment. The virtual ground device 42 includes an operational amplifier 43 and a voltage source 44. The inverting input terminal of the operational amplifier 43 is connected to the drain of the FET for sensing current, in other words, the upper end of the resistor 34. The output terminal of the operational amplifier 43 is connected to the lower end of the resistor 34 and the input terminal of the current detector 45. The non-inverting input terminal of the operational amplifier 43 is connected to the ground. The voltage source 44 has a positive terminal connected to the ground, and has a negative terminal connected to a ground terminal of the operational amplifier 43.

Figure 14:
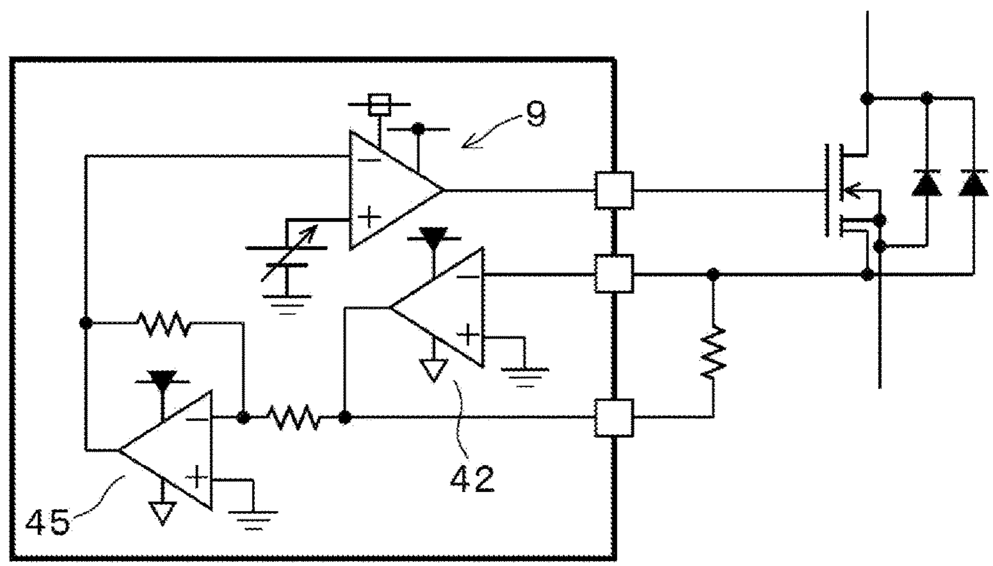
FIG. 14 illustrates a structure of controlling a gate voltage through feedback of a current value including a current detector.

The current detector 45 as illustrated in FIG. 14 is included in a level shift circuit, and shifts the upper end voltage of the resistor 34 virtually grounded by the virtual ground device 42, and sends the shifted upper end voltage to the driver 9. FIG. 14 illustrates that the virtual ground device 42 is symbolized.

In the driver 31 according to the fifth embodiment, a voltage applied to the gate of the FET 3 is decreased by the terminal voltage of the resistor 34. In the structure for controlling the gate voltage based on the current value, the control precision may be degraded since the terminal voltage changes according to the gate voltage. The control precision can be enhanced by virtually grounding the upper end voltage of the resistor 34 as in the driver 41 according to the sixth embodiment.

Seventh Embodiment

Figure 15A:
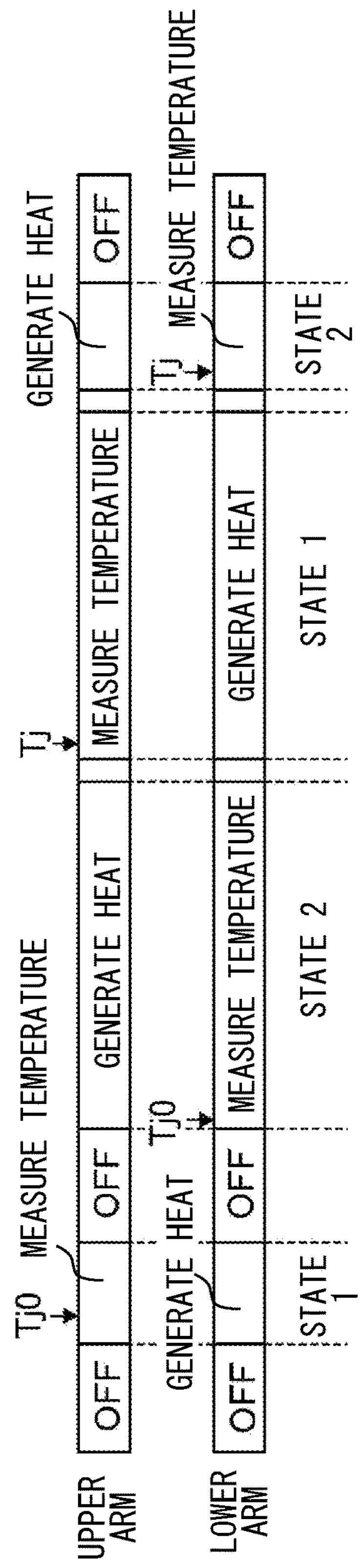
FIG. 15A illustrates a sequence for shortening a time for estimating the heat resistance of a field effect transistor (FET) in each of the upper and lower arm portions.
Figure 15B:
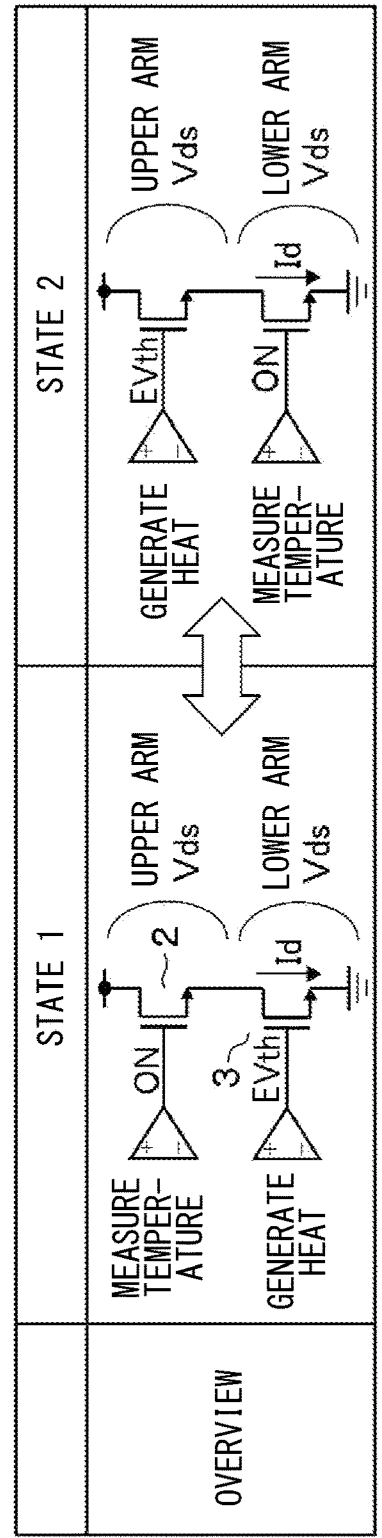
FIG. 15B illustrates an overview of the sequence for shortening a time for estimating the heat resistance of the FET in each of the upper and lower arm portions.

As illustrated in FIGS. 15A and 15B, the following describes a sequence for shortening the time required for estimating respective heat resistances of the FETs 2 and 3 in the upper and lower arm portions included in an arm. In order to estimate the heat resistance, it is required to heat the FET as an estimated target in advance. The gate voltage "ON" in FIG. 15 indicates the normal driving voltage to fully turn on the FET; and the gate voltage "$EV_{th}$" indicates a heat generation corresponding voltage that exceeds the threshold voltage $V_{th}$ and is below the normal driving voltage. A state in which the gate voltage ON is applied to the gate of FET 2 and the gate voltage $EV_{th}$ is applied to the gate of the FET 3 is defined as "state 1". A state in which the gate voltage $EV_{th}$ is applied to the FET 2 and the gate voltage ON is applied to the FET 3 is defined as "state 2".

In the seventh embodiment, a state in which both of the FETs 2 and 3 are in an OFF state is shifted to the "state 1", and then the temperature before heat generation $T_{j0}$ of the FET 2 is measured and the FET 3 is controlled to generate heat. Subsequently, the FETs 2 and 3 are turned off again and shifted to the "state 2". At the beginning of the shift, the temperature before the heat generation $T_{j0}$ of the FET 3 is measured.

The "state 2" is shifted to the "state 1" again via a period during which the FETs 2 and 3 are turned off. At the beginning of the shift, the temperature $T_j$ of the FET 2 heated by the "state 2" is measured. Subsequently, the "state 1" is shifted to the "state 2" via a period during which the FETs 2 and 3 are turned off. At the beginning of the shift, the temperature $T_j$ of the FET 3 heated by the "state 1" is measured. Subsequently, the FETs 2 and 3 are turned off and a series of sequence is completed.

According to the seventh embodiment, a sequence of estimating the heat resistances of the FETs 2 and 3 respectively in the upper and lower arm portions in an arm can be completed with a shorter time.

OTHER EMBODIMENTS

The semiconductor element is not only limited to the FET, but may also be a voltage-driven element.

Although the present disclosure has been described in accordance with the embodiments, it is understood that the present disclosure is not limited to such embodiments and structures. The present disclosure encompasses various modifications and variations within the scope of equivalents. Furthermore, various combination and formation, and other combination and formation including one, more than one or less than one element may be made in the present disclosure.

What is claimed is:

1. A power converter comprising:

a plurality of arms, each of which has two semiconductor elements being a first semiconductor element and a second semiconductor element connected in series, each of the two semiconductor elements configured to be driven by a voltage;

a temperature detector configured to detect a temperature of each of the two semiconductor elements;

a voltage detector configured to detect a voltage across conduction terminals of each of the two semiconductor elements;

a current detector configured to detect a current flowing through each of the two semiconductor elements;

a heat generation controller; and a heat resistance estimator, wherein the first semiconductor element is configured to be a target element whose heat resistance is estimated by the heat resistance estimator, the heat generation controller is configured to:

apply a driving signal to a control terminal of the target element to control heat generation of the target element, based on a condition that amount of the heat generation of the target element is restricted at a certain level or lower; and apply a driving signal to a control terminal of the second semiconductor element to fully turn on the second semiconductor element, and the heat resistance estimator is configured to estimate the heat resistance of the target element based on a temperature difference according to a first temperature of the target element and a second temperature of the target element, the first temperature being a temperature detected by the temperature detector in a state where the heat generation controller has not caused the target element to generate heat, the second temperature being a temperature detected by the temperature detector in a state where the heat generation controller has caused the target element to generate heat, a voltage across the conduction terminals of the target element detected by the voltage detector, and a current through the target element detected by the current detector.

2. The power converter according to claim 1, wherein the temperature detector is further configured to set the first temperature as a temperature detected by the temperature detector before the heat generation controller applies the driving signal to the control terminal of the target element.

3. The power converter according to claim 1, wherein the heat generation controller is further configured to set a driving voltage of the target element to be larger than a threshold voltage and smaller than a voltage required to fully turn on the target element, in order to maintain the second temperature at a constant level.

4. The power converter according to claim 1, wherein the heat generation controller is further configured to execute pulse-width-modulation control of a driving voltage of the target element at a frequency larger than or equal to a carrier frequency adopted in the pulse-width-modulation control at a time of switching the two semiconductor elements in a normal operation, in order to maintain the second temperature at a constant level.

5. The power converter according to claim 1, further comprising:

a sense resistor configured to be connected to a detection terminal of each of the two semiconductor elements, and further configured to detect the current through each of the two semiconductor elements, wherein the current detector includes a virtual ground device configured to virtually ground the detection terminal at a time of detecting a voltage of the detection terminal that is connected to the sense resistor.

6. The power converter according to claim 1, wherein, in a case where the heat resistance estimator estimates respective heat resistances of the first semiconductor element and the second semiconductor element, the temperature detector is further configured to:

detect a temperature of the second semiconductor element in a state where the heat generation controller has not caused the second semiconductor element to generate heat while the heat generation controller has caused the first semiconductor element to generate heat; and detect a temperature of the first semiconductor element in a state where the heat generation controller has not caused the first semiconductor element to generate heat while the heat generation controller has caused the second semiconductor element to generate heat, after the heat generation controller stops the first semiconductor element to generate heat and then the first semiconductor element cools down.

7. The power converter according to claim 1, wherein the heat resistance estimator is further configured to concurrently estimate heat resistances respectively for the plurality of arms, each of which has the first semiconductor element and the second semiconductor element connected in series.

8. The power converter according to claim 1, wherein the heat resistance estimator is further configured to enlarge an initial current initially flowing through the target element at a time where the heat generation controller starts to heat up the target element, such that a temperature of the target element reaches a target temperature with a time shorter than a reference time.

9. A power converter comprising:

a plurality of arms, each of which has two semiconductor elements being a first semiconductor element and a second semiconductor element connected in series, each of the two semiconductor elements configured to be driven by a voltage;

a temperature detector configured to detect a temperature of each of the two semiconductor elements;

a voltage detector configured to detect a voltage across conduction terminals of each of the two semiconductor elements;

a current detector configured to detect a current flowing through each of the two semiconductor elements;

a heat generation controller; and a heat resistance estimator, wherein the first semiconductor element is configured to be a target element whose heat resistance is estimated by the heat resistance estimator, the heat generation controller is configured to:

apply a driving signal to a control terminal of the target element to control heat generation of the target element, based on a condition that amount of the heat generation of the target element is restricted at a certain level or lower; and apply a driving signal to a control terminal of the second semiconductor element to fully turn on the second semiconductor element, and the heat resistance estimator includes a processor and a memory that stores instructions configured to, when executed by the processor, cause the processor to estimate the heat resistance of the target element based on a temperature difference according to a first temperature of the target element and a second temperature of the target element, the first temperature being a temperature detected by the temperature detector in a state where the heat generation controller has not caused the target element to generate heat, the second temperature being a temperature detected by the temperature detector in a state where the heat generation controller has caused the target element to generate heat, a voltage across the conduction terminals of the target element detected by the voltage detector, and a current through the target element detected by the current detector.

* * * * *